US006746974B1

(12) United States Patent
Reiterer et al.

(10) Patent No.: US 6,746,974 B1
(45) Date of Patent: *Jun. 8, 2004

(54) WEB MATERIAL COMPRISING A TACKIFIER

(75) Inventors: Philippe Reiterer, Beauchamp (FR); Jean Le Normand, Versailles (FR); Roy Parmentier, Wassenaar (NL); Christopher J. Carter, Nuneaton (GB)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 507 days.

(21) Appl. No.: 09/628,704

(22) Filed: Jul. 31, 2000

Related U.S. Application Data

(63) Continuation of application No. 09/254,647, filed on Mar. 10, 1999, now abandoned.

(51) Int. Cl.[7] ......................... B32B 27/04; B32B 27/12; B32B 5/02; B32B 27/02; B32B 5/26; B08B 1/00; A47L 1/06; A47L 13/00; A47L 23/04; A47L 25/00; D04H 1/46; D04H 1/70; D04H 11/08; D04H 13/00

(52) U.S. Cl. ....................... 442/101; 442/151; 442/154; 442/392; 15/104.93; 15/209.1; 28/104

(58) Field of Search ........................... 15/104.93, 209.1; 28/104; 206/210, 233, 447, 494, 499; 221/33, 45, 62, 63; 442/392, 151, 154, 97, 101

(56) References Cited

U.S. PATENT DOCUMENTS 1,587,463 A * 6/1926 Arms
1,794,890 A * 3/1931 Frost (List continued on next page.)

FOREIGN PATENT DOCUMENTS

| | | | | |
|---|---|---|---|---|
| CA | 1305839 | * | 4/1992 | |
| CA | 1305839 | | 8/1992 | ........... A74L/13/16 |
| EP | 0262026 | * | 3/1988 | |
| EP | 0 262 026 | | 3/1988 | ........... A47L/13/16 |
| FR | 796120 | * | 3/1936 | |
| FR | 1 345 567 | | 3/1962 | |
| FR | 1 348 712 | | 1/1963 | |
| FR | 1345567 | * | 12/1963 | |
| FR | 1348712 | * | 12/1964 | |
| GB | 935 803 | | 9/1963 | |
| GB | 1330126 | * | 9/1973 | |
| GB | 1 330 126 | | 9/1973 | ........... A47L/25/08 |
| GB | 2149762 | * | 6/1985 | |
| GB | 2 149 762 | | 6/1985 | ............ B65H/1/00 |

*Primary Examiner*—Elizabeth M. Cole
*Assistant Examiner*—Jeremy R Pierce
(74) *Attorney, Agent, or Firm*—Richard Francis; Gregory D. Allen

(57) ABSTRACT

The present invention provides a web material useful as a tack pad comprising a non-woven cross-laid web which is needle-tacked and at least one of chemically or thermally-bonded and at least one major surface of which is impregnated with a tackifier. The invention also provides a dispenser that will accept a stack of tack pads. The dispenser is shaped to contain a stack of tack pads in position over an outlet opening in the bottom of the dispenser and to permit one access to one edge of the bottom pad of the stack. The edge is located inside the dispenser and the dispenser comprises an at least partially open front and a door mounted on the dispenser. The door may be pivoted between an open position and a closed position over the front. The door has turned-back side edges to fit around the dispenser to prevent dust from entering the dispenser. The bottom pad can be pulled downwardly away from the stack through the outlet opening.

10 Claims, 4 Drawing Sheets

U.S. PATENT DOCUMENTS

| | | | | | |
|---|---|---|---|---|---|
| 2,236,527 | A | | 4/1941 | Drew | |
| 2,410,078 | A | | 10/1946 | Kellgren | 117/155 |
| 2,410,089 | A | | 10/1946 | Lundquist et al. | 117/122 |
| 2,426,787 | A | | 9/1947 | O'Neil | 312/60 |
| 2,438,195 | A | | 3/1948 | Tierney | 117/122 |
| 2,553,816 | A | | 5/1951 | Ebel | 117/122 |
| 2,633,958 | A | | 4/1953 | Childers | 194/10 |
| 2,923,435 | A | * | 2/1960 | Chaplin | |
| 2,955,962 | A | | 10/1960 | Engdahl | 117/140 |
| 3,016,555 | A | * | 1/1962 | Penoyer | |
| 3,028,618 | A | * | 4/1962 | Lyman | |
| 3,056,154 | A | * | 10/1962 | Neal | 206/447 |
| 3,208,093 | A | * | 9/1965 | Hansen | 15/104.93 |
| 3,307,214 | A | * | 3/1967 | Belvedere | |
| 3,342,325 | A | * | 9/1967 | Dreher | |
| 3,450,308 | A | * | 6/1969 | Schoenefeld | |
| 3,658,578 | A | * | 4/1972 | Bennett | |
| 3,747,802 | A | * | 7/1973 | Uroshevich | 220/839 X |
| 3,780,392 | A | * | 12/1973 | Lester | 15/104.93 |
| 3,935,965 | A | * | 2/1976 | Stevens | |
| 4,276,338 | A | * | 6/1981 | Ludwa et al. | 15/209.1 X |
| 4,352,846 | A | * | 10/1982 | Passler et al. | 15/209.1 X |
| 4,515,854 | A | * | 5/1985 | Kogame et al. | 28/103 X |
| 4,837,079 | A | * | 6/1989 | Quantrille et al. | 15/104.93 X |
| 5,053,482 | A | * | 10/1991 | Tietz | 428/480 X |
| 5,198,292 | A | * | 3/1993 | Lerner et al. | |
| 5,198,293 | A | * | 3/1993 | Metrick | |
| 5,240,764 | A | * | 8/1993 | Haid et al. | |
| 5,422,159 | A | * | 6/1995 | Fagan | 28/104 X |
| 5,656,361 | A | * | 8/1997 | Vogt et al. | 15/104.93 X |

* cited by examiner

WEB MATERIAL COMPRISING A TACKIFIER

This is a continuation of application Ser. No. 09/254,647 filed Mar. 10, 1999, now abandoned.

The present invention relates to web material incorporating a tackifier and to pads formed from such material. The invention also relates to a dispenser for pads formed from web material which incorporates a tackifier.

So-called tack cloths, or tack rags, for use in removing dust or similar foreign matter from surfaces are already known and are widely used, both in industry and in the domestic situation. Among the largest users of tack cloths are vehicle manufacturers, and also vehicle repairers such as bodyshops, who apply paints and lacquers to large areas of vehicle surfaces. To enable a flawless finish to be achieved when painting/repainting a vehicle surface, it is essential that the surface should be maintained free of foreign particles and, even when painting/repainting operations are carried out in closed areas provided with air conditioning and filter systems, tack cloths are still employed to ensure that every foreign particle is removed.

Generally, tack cloths comprise some form of textile material which has an open structure and is treated with a tackifier to give it a sticky or tacky character. When such a cloth is rubbed over a surface, foreign matter (such as dust) which is present on the surface will adhere to the cloth and be removed. Various forms of tack cloth are described in, for example U.S. Pat. Nos. 2,633,958, 2,955,962, 3,016,555, 3,028,618, 3,208,093, 3,307,214, 3,658,578, 5,198,292 and 5,198,293 and Canadian Patent Specification No. 1,305,839. Examples of commercially available tack cloths or tack rags include "Evercoat Professional Tack Cloth", commercially available from Fibre Glass Evercoat Co., Inc., of Cincinnati, Ohio, U.S.A.; "Crystal Tack Cloth", commercially available from Bond Chemical Products Company of Chicago, Ill., U.S.A.; "Lint Free Tack Cloth", commercially available from Datco International, of Hazel Park, Mich., U.S.A. A tack cloth comprising a pad of a non-woven web material impregnated with a tackifier has also been available, under the trade designation "0966 1" from Minnesota Mining and Manufacturing Company of St. Paul, Minn., U.S.A.

The present invention is directed to the provision of web material incorporating a tackifier, suitable for use particularly as pads to enable dust and similar foreign matter to be removed effectively from surfaces. The present invention is also concerned with providing a dispenser for such pads.

The present invention provides a web material comprising a non-woven cross-laid web which is needle-tacked and chemically- and/or thermally-bonded, and at least one major surface of which is impregnated with a tackifier.

The non-woven web may comprise synthetic fibres, for example nylon, polyester, polypropylene, or mixtures thereof The tackifier may comprise a pressure-sensitive adhesive, for example an acrylic pressure-sensitive adhesive. The non-woven web may be impregnated throughout with the tackifier. The non-woven web may also comprise a binder resin, for example an ethylene vinylacetate copolymer.

The present invention also provides a tack pad comprising a pad of web material as defined above. The pad may further comprise a liner material located on, and releasably adhering to, one surface of the pad, the liner material having a low adhesion coating on the side remote from the pad. The liner material may, for example be a paper material having a polyethylene coating on the side remote from the non-woven web.

The present invention further provides a method of making a web material comprising the steps of forming a non-woven, cross-laid web which includes thermo-bonding fibres, needle-tacking the web, impregnating at least one surface of the web with a tackifier, and applying heat to thermally-bond the web and cure the tackifier. Advantageously, the steps of thermally bonding the web and curing the tackifier are carried out simultaneously. Preferably, the tackifier is applied to the web as an aqueous dispersion.

The method may further include the steps of impregnating the web with a binder resin and applying heat to cure the binder resin. Preferably, the binder resin is applied to the web as an aqueous dispersion.

Advantageously, the binder resin is applied to the web simultaneously with the tackifier and is cured simultaneously with the tackifier.

The thermobonding fibres used in a method in accordance with the invention may be multi-component fibres and may comprise polyamide, polyethylene, polyester, polypropylene, or mixtures thereof.

The step of impregnating at least one surface of the web with a tackifier may comprise applying to the web, as an aqueous dispersion, a mixture of an acrylic pressure-sensitive adhesive and an ethylene vinylacetate copolymer. The mixture may also comprise a surfactant and a catalyst.

The present invention further provides a dispenser for pads of material, the dispenser being shaped to contain a stack of the pads in position over an outlet opening in the bottom of the dispenser, and to permit access to one edge of the bottom pad of the stack whereby the bottom pad can be pulled downwardly away from the stack through the outlet opening.

The dispenser may have a loading opening through which a stack of pads can be placed in the dispenser. The loading opening may be in the front of the dispenser and in communication with the outlet opening, thereby providing the said access to one edge of the bottom pad of a stack in the dispenser. The dispenser may include a cover for the loading opening, the cover being movable between an open and a closed position. The dispenser may include stop portions which project into the loading opening to prevent a stack in the dispenser moving out of the dispenser through the loading opening.

By way of example only, embodiments of the invention will be described with reference to the accompanying drawings, in which.

Figure 1:
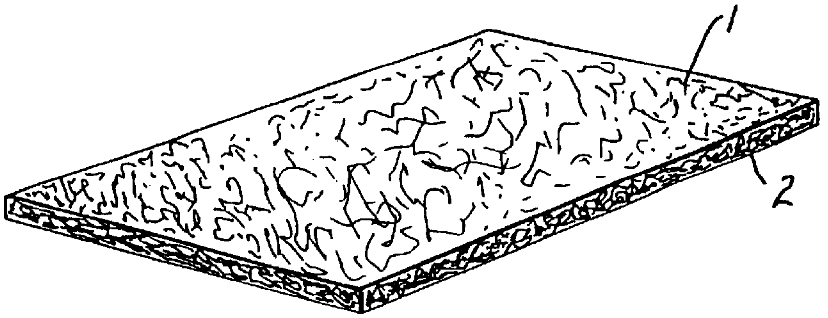
FIG. 1 shows a tack pad in accordance with the invention.

The tack pad 1 shown in FIG. 1 comprises a rectangular pad of web material. The web material, which will be described in greater detail below, comprises a non-woven cross-laid web which is needled and thermally/chemically bonded, and impregnated with a tackifier. The tack pad 1 is provided, on one side only, with a sheet 2 of liner material of the same size as the pad.

Figure 2:
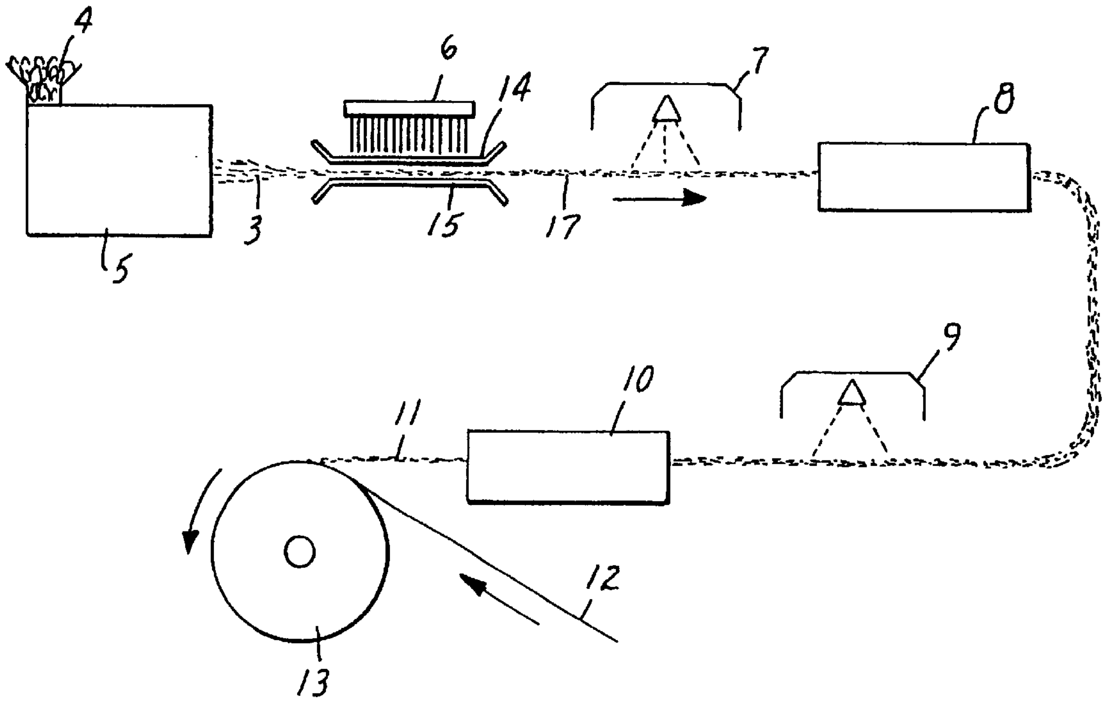
FIG. 2 is a diagrammatic illustration of the production of web material for use in manufacturing tack pads as shown in FIG. 1

A process for producing pads of the type shown in FIG. 1 will now be described with reference to FIG. 2. In the process illustrated in FIG. 2, a non-woven web 3 is produced from fibrous raw material 4 by web making apparatus 5 (indicated schematically only). The web 3 then passes to needle tacking apparatus 6, following which it is impregnated on one side with a tackifier formulation (applied by a spray system 7) and dried in an oven 8. The other side of the web is then impregnated with the tackifier formulation (applied by a spray system 9) and the web is again dried, either by a second passage through the oven 8 or, as shown, in a further oven 10. The web material 11 which is so formed is then wound, together with a liner material 12, onto a roll 13. When required, the web material 11 is unwound from the roll 13, together with the liner material 12, and cut into pads as shown in FIG. 1.

The fibrous raw material 4 supplied to the web-making apparatus 5 can be any suitable fibrous material comprising synthetic or artificial or natural fibres or mixtures thereof. Preferably, synthetic fibrous material is used, for example polyester, nylon, polypropylene or mixtures thereof of any appropriate fibre length and denier. The fibrous raw material 4 includes an amount (typically in the range of from 15 to 25% by weight) of thermobonding fibrous material. Any suitable thermo-bonding fibrous material can be used, for example polyethylene, polyamide, polyester, polypropylene and mixtures thereof of any appropriate fibre length and denier, provided that the melting point of the thermo-bonding material is similar to, but lower than, the melting point of the other fibrous material in the web. The thermo-bonding fibres may be single-component fibres, for example polyester fibres available under the trade designations: "MELTY" from Unitika Ltd. of Osaka, Japan; "GRILENE K-1 70" from EMS-Grilon SA of Domat/Ems, Switzerland; and "KODEL" from Eastman Chemical International Company of Tennessee, U.S.A. Alternatively, the thermo-bonding fibres may be bi-component fibres comprising a low melting point polymer and a high melting point polymer located together (for example, in a side-by-side or a sheath/core relationship) along the length of the fibres. Bi-component thermo-bonding fibres are known and are available, for example, under the trade designations: "VRELLBOND" from Wellman Inc. of Boston, Mass. U.S.A.., "DANAKLON ES" from Jacob Holm Varde A/S, Denmark; "DAIWABO NBF" from Chon' Company Ltd. of Osaka, Japan; and "MELTY" from Unitika Ltd. of Osaka, Japan.

Preferably, the fibrous raw material 4 supplied to the web-making apparatus 5 comprises a mixture of 80% by weight of 15 denier polyester fibre having a fibre length of 70 mm, and 20% by weight of bi-component 6 denier polyester thermo-bonding fibres having a fibre length of 50 mm, available under the trade designation "91 TBM", from Montefibre of Milan, Italy.

The web-making apparatus 5 can be any known type capable of producing a non-woven cross-laid web from fibrous raw material and need not be described in detail. Generally, the apparatus 5 produces a single-layer carded web of aligned fibres which is then cross-laid to form a web having a multi-layer structure in which the fibres, although still aligned with each other, are displaced out of alignment with the lengthwise direction of the web. Preferably, the web-making apparatus 5 is operated so that the web 3 leaving the apparatus has a basis weight of about 100 g/m$^2$.

The needle tacking apparatus 6 to which the web 3 passes from the web-making apparatus 5 is conventional and comprises a needling zone, defined between upper and lower plates 14, 15, in which the web is compressed and is also repeatedly punctured by a reciprocating array of needles 16 acting perpendicular to the plane of the web. The side surfaces of the needles 16 are barbed, or roughened, so that the needles will catch on some of the fibres in the web 3 and pull them in a direction perpendicular to the plane of the web, giving a degree of mechanical bonding to the web. The mechanical bonding should be sufficient to provide integrity to the web, but not so great that the flexibility of the final web material and the tack pads 1 is detrimentally affected.

The spray systems 7, 9 are identical and can be of any suitable commercially available type. Each spray system directs a tackifier formulation at a respective surface of the compressed and needled web 17 from the needle tacking apparatus 6. The term "tackifier" is used to describe a substance which, when applied to a material, will make the material tacky or sticky and capable of picking up and retaining foreign matter. In this case, the tackifier should be tacky at the normal temperatures at which the web material will be used but should not leave a deposit on the surface that is being cleaned or, preferably, on the user's hands. To enable the tackifier to be delivered by the spray systems 7, 9, it should be in the form of a liquid under manufacturing conditions.

Tackifiers are known and any suitable formulation can be applied to the web 17 by the spray systems 7, 9. Examples of suitable tackifiers include: a mixture of a polystyrene and methyl dihydroabietate, e.g., as disclosed in U.S. Pat. No. 3,028,618; amorphous polypropylene having a molecular weight in the range from 2000 to 8000, e.g., as disclosed in U.S. Pat. No. 3,658,578; a mixture of a polyester of an aliphatic glycol and a dibasic cyclic organic acid selected from hexachloroendomethylene-tetrahydrophthalic acid, tetrachlorophthalic acid and anhydrides thereof and a triester of a phosphoric acid, e.g., as disclosed in U.S. Pat. No. 3,016,555; chlorinated biphenyls, triphenyis and paraffins, e.g., as disclosed in U.S. Pat. No. 2,633,593 and a dispersion of a polymer comprising a vinylidene group in a mixture of phthalate and phosphate esters, e.g., as disclosed in U.S. Pat. No. 3,208,093.

Other suitable tackifiers include selected pressure-sensitive adhesives, for example: poly(methyl isoamylacrylate); a mixture of poly(vinyl ethyl ether) and terpene phenolic resin; a mixture of pale crepe natural rubber and terpene phenolic resin and a mixture of high and low molecular weight poly(isobutylene), methyl dihydroabietate and polyterpene resin as disclosed in U.S. Pat. No. 2,955,962. Other suitable pressure-sensitive adhesives are described in U.S. Pat. Nos. 2,236,527; 2,410,078; 2,410,089; 2,438,195 and 2,553,816, The tackifier may be applied to the web 17 as a solution in an organic solvent but it is preferably applied as an aqueous dispersion.

A preferred tackifier is "Rhodo Tack" (an aqueous acrylic dispersion) available from Rhone Poulenc of Venissieux, France and it is preferably applied to the web 17 in combination with a binder resin which will increase the shear resistance of the tackifier and also give additional cohesion and strength to the web. By increasing the shear resistance of the tackifier, the binder resin inhibits transfer of the tackifier to the workpiece and to the user's hands and also allows the tack level of the finished web material 11 to be controlled so that it will not adhere excessively to the liner material 12. A preferred binder resin is "Vinamul 3 23 1" (an aqueous dispersion of ethylene vinylacetate copolymer) available from Vinamul Ltd. of Surrey, England. The relative amounts of tackifier and binder resin can be adjusted to vary the tackiness and stiffness of the web and they are preferably combined with very small amounts of a surfactant (to improve the coating onto the fibres of the web) and a catalyst (to promote cross-linking). A suitable surfactant is a fluorochemical wetting agent available, under the trade designation "Fluorat FC430", from Minnesota Mining and Manufacturing Company of St. Paul, Minn., U.S.A. and used as a 20% solution in a 50/50 mixture of water and isopropyl alcohol, and a suitable catalyst is citric acid powder. The preferred formulation applied to the web 17 by the spray systems 7, 9 comprises by weight: 40.4% "Rhodo Tack"-, 27.0% "Vinamul 3231"-, 30.9% water-, 1.0% surfactant ("Fluorat FC430" in solution as described)-, and 0.7% citric acid powder. The formulation is applied to the web 17 at a rate, on each side, within the range of from 100 to 200 $g/m^2$, and, preferably at a rate on each side of 180 $g/m^2$.

After each side of the web 17 has been impregnated with the tackifier formulation, the web is passed through an oven to soften the thermo-bonding fibres in the web and, simultaneously, to cure the tackifier and the binder resin in the tackifier formulation. The appropriate oven temperature will depend on the nature of the thermo-bonding fibres and on the tackifier formulation but, for the preferred web materials and tackifier formulation described above is a temperature of about 140° C. maintained for at least 3 minutes.

Figure 3:
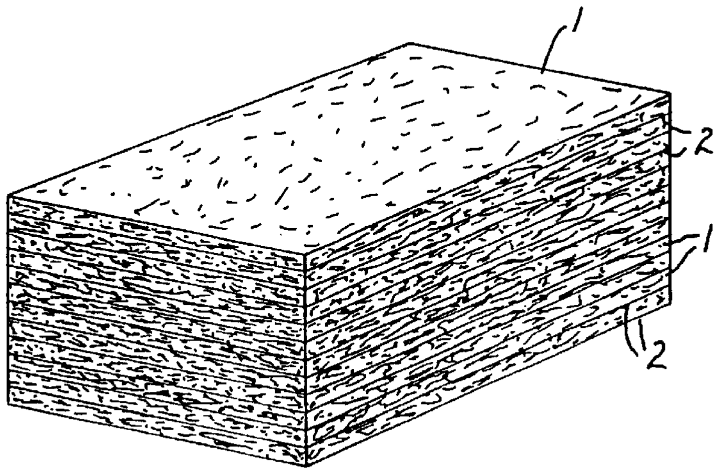
FIG. 3 shows a stack of the pads of FIG. 1-1
Figure 4:
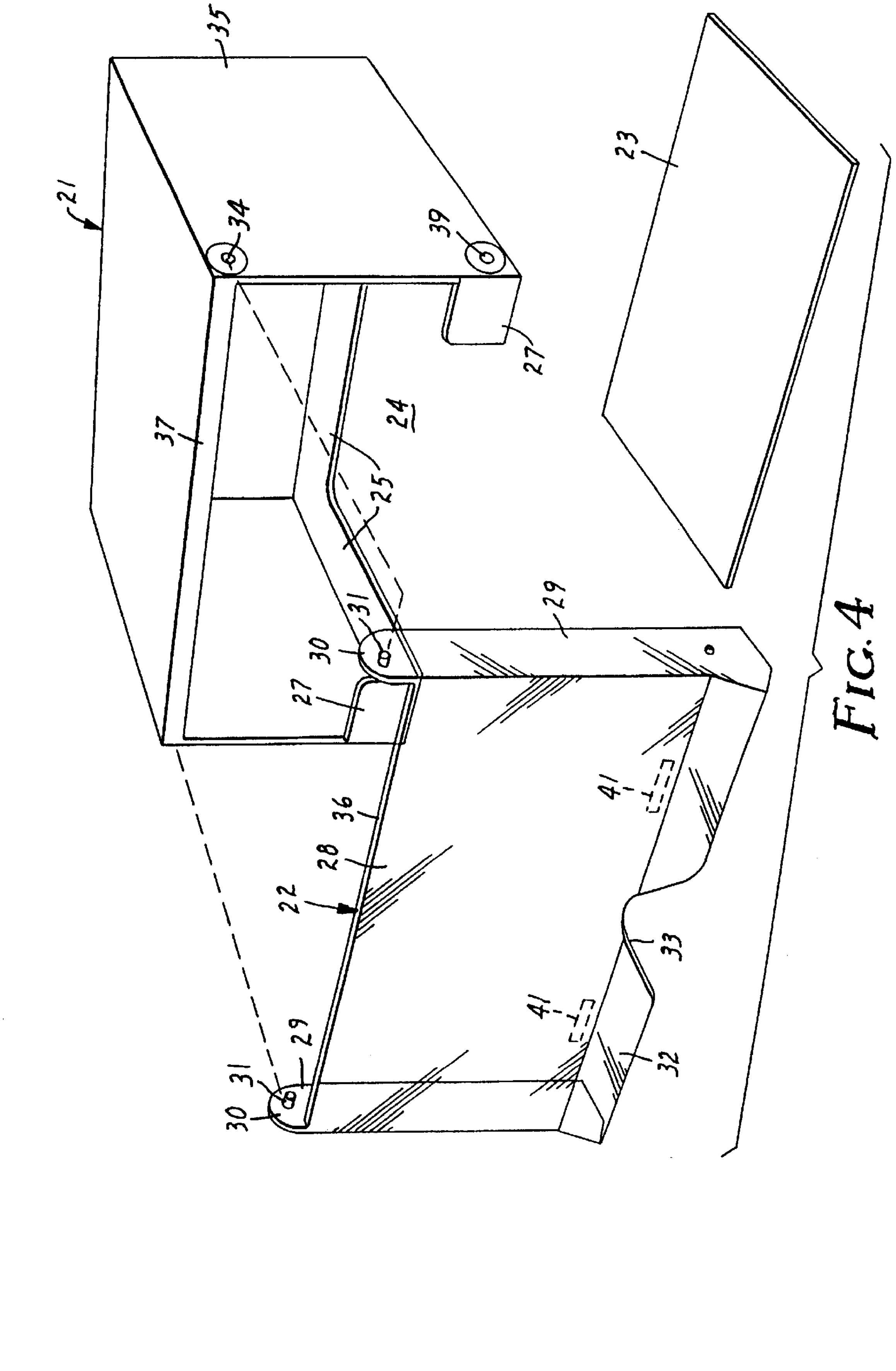
FIG. 4 is an exploded perspective view of a dispenser for pads of the type shown in FIG. 2.
Figure 5:
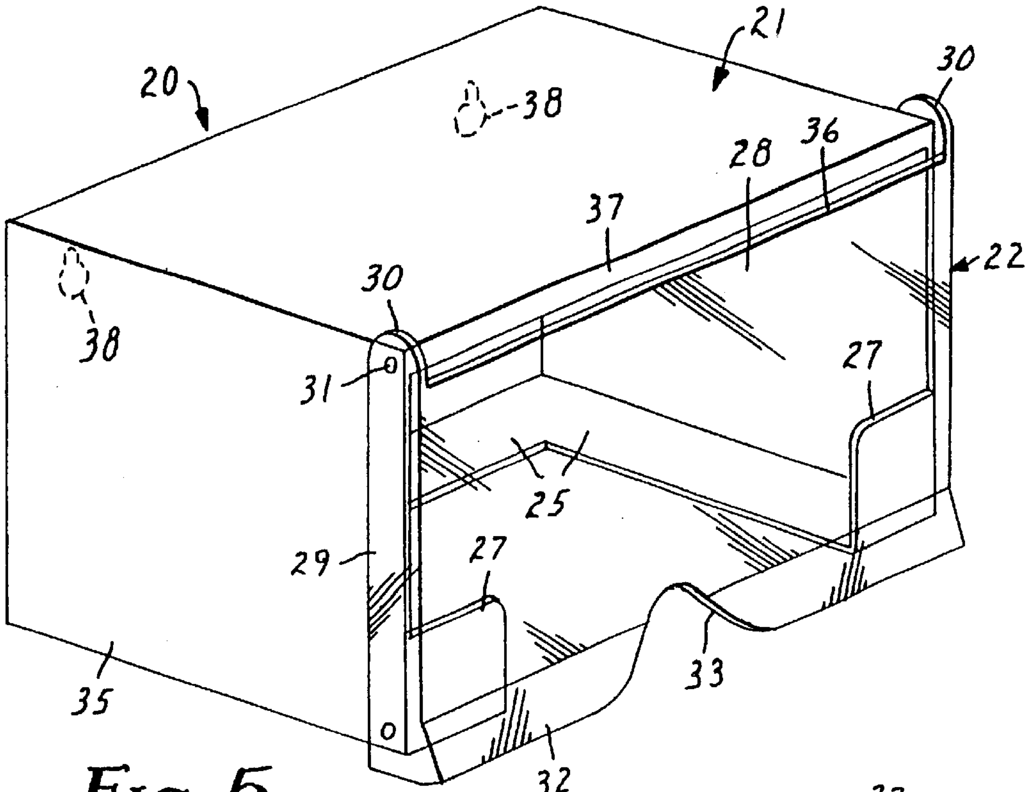
FIG. 5 is a perspective view of the dispenser of FIG. 4, from the other side, showing the door of the dispenser in the closed position.

The liner material 12 that is wound onto the roll 13 with the tacky web material is preferably paper coated on one side with polyethylene. A suitable paper, having a weight of 70 $g/m^2$ and coated on one side with polyethylene to a weight of 17 $g/m^2$ is available from Siliconature S.p.A. of Godegadi S. Urbano, Italy. The coated side of the liner material has low adhesion to the tacky web material but the uncoated side (which is the one that is applied adjacent the web) does not and will, therefore, not slip relative to the web when being wound onto the roll 13. When the web material is subsequently cut into pads as shown in FIG. 1, the liner material allows the pads to be stacked one on top of another for packaging without adhering to each other since the coated side of the liner of one pad will contact the adjacent pad. Such a stack of pads is illustrated in FIG. 3. In this case, each pad has the liner material adjacent its lower surface, so that only the upper surface of the top pad of the stack, and the sides of the pads, are exposed.

It will be appreciated that other forms of liner material are available and could be used with the pads 1 instead of the polyethylene-coated paper described above. The latter is preferred, however, particularly for pads that are intended for use by vehicle manufacturers and repairers since it contains a negligible amount of free silicone.

From the above description, it will be understood that (in its preferred form) the pad 1 shown in FIG. 1 comprises a non-woven, cross-laid polyester web which is needled and bonded, both thermally (by the heating of the thermo-bonding polyester fibres ("91TBM") present in the web) and chemically (by the curing of the binder resin ("Vinamul 3231") applied by the spray systems 7, 9) and impregnated on both surfaces by a tackifier ("Rhodo Tack"). The liner 2 of the pad is a paper material which is uncoated on the side adjacent the pad but is coated on the other side with polyethylene. Various modifications to the process illustrated in FIG. 2 are, however, possible and may result in modification of the web material produced and, consequently, in the pads 1. For example, although the tackifier formulation applied to the needled web 17 by the spray systems 7,9 includes a binder resin, it may in certain circumstances be possible to omit the binder resin provided that adequate bonding of the web can be obtained through the use of thermo-bonding fibres. Generally, an increase in the amount of thermo-bonding fibres will increase the stiffness of the final web material and it may be difficult to obtain adequately-bonded but flexible pads without the use of a binder resin. It will also be appreciated, from the description above, that other fibrous materials can be used in the formation of the web 3.

In some cases, it may not be required to produce web material 11 which is tacky on both sides, in which case the second spray system and oven 9, 10 can be omitted. It may also, in some cases, be preferable to carry out the thermal bonding of the needled web 17 before it is treated with the tackifier formulation, in which case the needled web can be passed through an oven before it reaches the first spray system 7.

In some cases, the thermobonding fibres can be omitted and (depending on the intended use of the web material) it may be found possible to obtain an adequately-bonded web through the combination of the mechanical bonding provided by the needle tacking and the chemical-bonding provided by the binder resin in the tackifier formulation. Alternatively, if a greater degree of bonding is required, it may be provided by (for example) applying a thermobonding powder to the web before it enters the/each oven 8, 10 or applying additional binder resin to the web. In the latter case, the additional binder resin is preferably applied to the needled web and cured before the tackifier formulation is applied to the web.

If desired, the pads 1 may additionally be impregnated with a biocidal agent and/or a perfuming agent.

In their preferred form, described above, the pads 1 are easy to hold and use and, because they have a degree of thickness, will pick-up and hold dust efficiently.

The web material is uniform, is effectively bonded and does not lint (i.e. deposit fibres) when in use. The tackifier remains tacky (so that the pads do not tend to dry out over a period of time) but does not transfer to any noticeable extent to the user's hands. The pads are also washable and then re-usable.

If required, the pads can be provided with a liner material on both sides. Normally, however, when the pads are stacked together for packing (as illustrated in FIG. 3) a liner material on one side only is satisfactory and is preferred since it gives rise to less waste and is also less expensive.

The pads 1 can have any suitable size and shape but, generally, are rectangular and of a size between about 90 mm×120 mm and 230 mm×280 mm (typically 180 mm×240 mm) with a thickness of between about 5 mm and 10 mm (typically 6 mm).

To ensure that the pads 1 remain clean until required, they should be packed and stored in such a way that they are kept free of dust (which would otherwise settle on, and adhere to, the pads). Conventionally, for that reason, known tack cloths are packed in sealed bags, either individually or a few at a time. As a result, a comparatively large amount of packaging material is used which is undesirable for environmental reasons and also gives rise to increased costs. In addition, it is inconvenient for the user to have to remove such packaging every time a new tack cloth is required.

FIGS. 4 to 7 illustrate a dispenser 20 which can be used, in the workplace, to hold a stack of pads as illustrated in FIG. 3. The dispenser will keep the pads free from dust without the need for them to be packed in sealed bags but also makes the pads readily accessible to the user.

The dispenser 20 comprises a body portion 21, having the general form of an open-fronted rectangular box, a door 22 (shown separated from the body in FIG. 4), and a loose, rectangular cover plate 23 of similar size to the top and bottom faces of the body. A rectangular outlet opening 24 is formed in the bottom of the box-shaped body 21, from the front of the latter, leaving a ledge 25 at the back and side edges of the opening. At each bottom corner of the front of the body 21 is a respective stop portion 27, the purpose of which will be described below.

The dispenser body 21 is a moulded plastics component, as are the door 22 and the cover 23. The door is preferably transparent so that the interior of the dispenser can be seen when the door is closed.

The door 22 is in the form of a plate 28 which will fit over the open front of the body 21. The plate 28 has turned-back side portions 29, the top of each of which is extended upwards by a short distance as indicated at 30 and is provided with a pin 31 by which the lid can be pivotally-mounted on the body 21. In addition the bottom edge 32 of the plate 28 is turned outwardly and formed with a central cut-out 33, the purpose of which will also be described below.

The door 22 is mounted on the body 21 by locating the pins 31 in pivotal mountings 34, formed in the upper front corner of each side 35 of the body. The door 22 can then be pivoted between a closed position, illustrated in FIG. 5, in which the plate portion 28 of the door lies adjacent the open front of the body 21 and an open position, illustrated in FIG. 6, in which the door is raised to expose the open front of the body. When the door 22 is in the closed position, the turned-back side portions 29 fit around the sides of the body 21 and help to keep the interior of the dispenser free of dust. Stops 36 in the bottom front corners of the sides 35 of the body 21 frictionally-engage the side portions 29 of the door and help to hold the door in the closed position. The extensions 30 at the top of the side portions 29, which facilitate the pivotal movement of the door 22, cause the top edge 36 of the door to be located below the top front edge of the body 21 when the door is in the closed position and, to prevent dust entering the dispenser, the resulting gap is closed by a lip 37 along the top front edge of the body. The outwardly-turned bottom edge 32 of the door 22, which extends slightly below the bottom front edge of the body 21 when the door is closed, facilitates the lifting of the door into the open position. The central cut-out 33 in the door, which extends above the bottom front edge of the body 21 when the lid is closed, enables pads to be removed from the dispenser as will now be described.

The dispenser 20 is intended to be mounted on a wall and, to that end, two holes 38 (indicated only in FIG. 5) are formed in the rear wall of the body 21 so that it can be located on screws or hooks in the wall.

Figure 6:
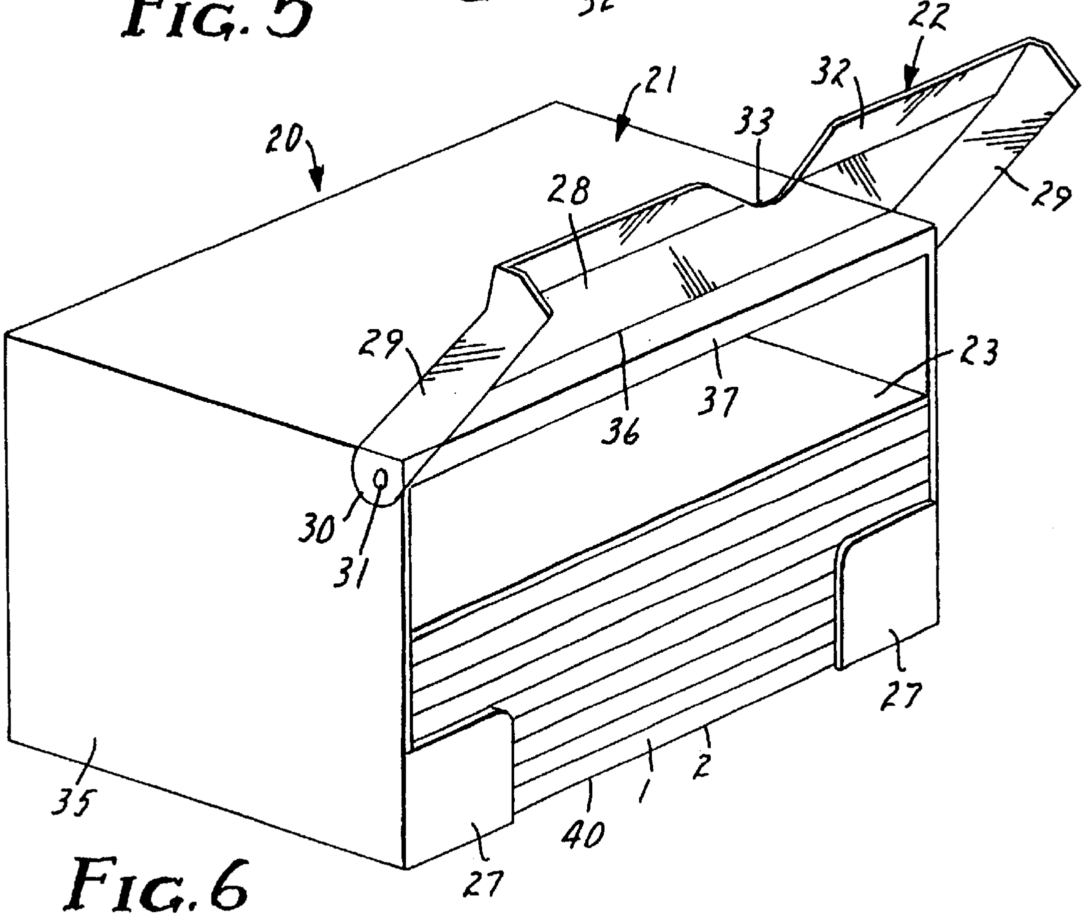
FIG. 6 is similar to FIG. 5 but shows the door in the open position and a stack of tack pads in the dispenser.

FIG. 6 shows a stack 40 of tack pads which has just been located in the dispenser 20. The stack of pads is as illustrated in FIG. 3: that is, each pad 1 is provided on it lower side with a paper liner 2, the upper surface of the liner being uncoated so that it does not slip readily relative to the pad and the lower surface being coated with polyethylene so that it will not adhere to the pad below. The stack of pads is inserted in the dispenser by lifting the door 22 to the open position as shown and placing the pads, through the open front of the dispenser, onto the ledge 25. The loose cover plate 23 is located on the top of the stack of pads, and the door 22 of the dispenser is then closed.

It will be appreciated that protection for the pads against contamination by dust is provided not only by the door 22 of the dispenser 20 but also by the liner 2 of the bottom pad of the stack and by the cover plate 23.

Figure 7:
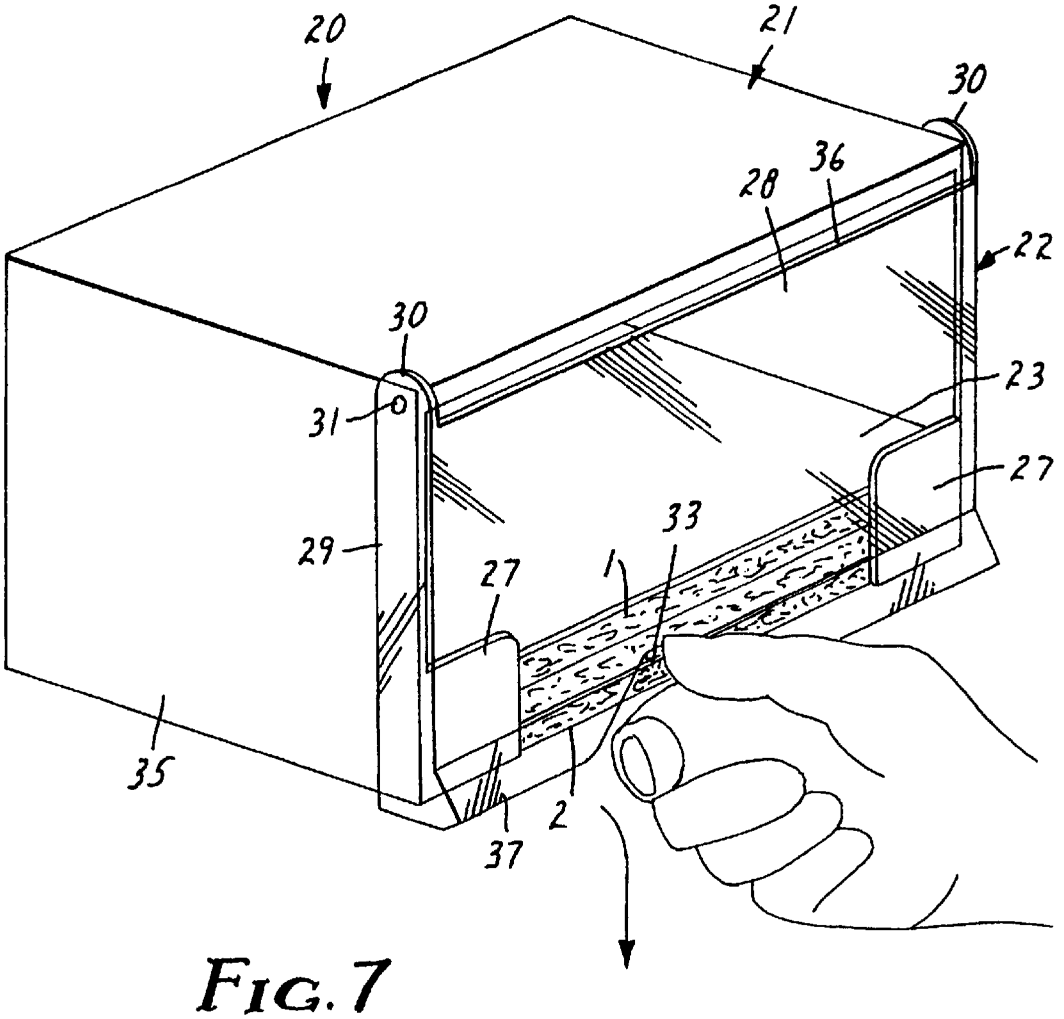
FIG. 7 is similar to FIG. 6 but shows the door in the closed position and a pad being removed from the dispenser.

When it is required to remove a pad from the dispenser 20, the user inserts a thumb between the lower pad of the stack and the liner of the pad above, as illustrated in FIG. 7, and pulls the-lower pad by its front edge in a downwards direction, thereby peeling the pad away from the stack through the openings 24, 26 in the bottom of the dispenser. The central cut-out 33 in the lower edge of the door 22 provides easy access to the lower pad of the stack, but does not allow ready access to the pad above and thus helps to prevent the removal of more than one pad at a time. Once the front edge of the lower pad has been grasped, the removal of the pad is aided by the polyethylene coating on the liner above. If any forwards movement of the stack is caused by the removal of the lower pad, the front stops 27 on the dispenser body 21 ensure that the stack is retained within the dispenser. When the lower pad has been removed, the stack of pads remaining in the dispenser settles down onto the ledge 25 and remains protected against dust as described above.

To assist in the removal of pads from the dispenser 20 as described above, it may be found helpful in some cases to provide one or more stop portions on the inside surface of the door 22 to inhibit the removal of more than one pad at a time. Such stop portions are shown in dotted lines and indicated by the reference 41 in FIG. 4 and may be positioned, for example, so that they will frictionally engage the edge of the next-to-bottom pad of the stack 40 in the dispenser. The stop portions may have a toothed or serrated edge for increased frictional engagement with the pad.

The space above the cover plate 23 on top of the stack provides a convenient storage place for tack pads that are in use and is accessible simply by raising the dispenser door 22. The cover plate thus functions as a divider between those pads and the clean pads beneath, as well as serving to protect the clean pads from dust.

It will be appreciated that the width of the ledge 25 at the bottom of the dispenser 21 should be sufficient to ensure that the stack of pads is well retained within the dispenser and does not tend to sag through the openings 24. On the other hand, the opening 24 needs to be large enough to ensure that the bottom pad can readily be pulled away out of the dispenser and leave the remainder of the stack undisturbed. The most appropriate dimensions for the ledge 25 and the opening 24 will thus be dependent on the characteristics of the tack pads, particularly the stiffness of the pads (plus liners) and the degree of adhesion between the pads and the liners, and can be determined in each case. For the preferred form of pads and liners described above, the floor of the dispenser is about 5 mm larger in each direction than the pads (i.e. about 185 mm×245 mm), and the ledge 25 is about 30 mm wide. The height of the dispenser is about 140 mm, enabling it to receive a stack of eight to twelve tack pads with liners and still provide adequate space above the cover plate 23 for storage of tack pads that are in use.

In some cases, depending on the characteristics of the pads, it may be desirable to decrease the width of the opening 24 at the front of the dispenser, for example by extending the ledge 25 part way across the front of the dispenser from each side.

It will be appreciated that the overall shape of the dispenser 20 is determined by the pads that it is intended to house and that the particular shape shown in the drawings is not essential. It will also be appreciated that a dispenser of the type shown in the drawings can be used for other forms of tack pads or, indeed, for items other than tack pads. A dispenser of the type described above is, however, particularly suitable for items such as tack pads which require protection from dust and, by their nature, tend to adhere to one another and require a peeling, rather than a sliding, action to separate them. The use of a dispenser as shown in the drawings makes it unnecessary to package the tack pads individually, or in small quantities, in sealed bags. Instead, a large quantity of pads can be supplied to the user in a single sealed package from which small stacks of the pads can be taken and loaded into the dispenser as required.

What is claimed is:

1. A tack pad having opposite major surfaces and a thickness of at least about 5 mm comprising a non-woven cross-laid carded web having a multi-layer structure which is needle-tacked and bonded, at least one major surface of which is impregnated with an acrylic tackifier.

2. The tack pad as claimed in claim 1, in which the tackifier comprises an acrylic pressure-sensitive adhesive material.

3. The tack pad as claimed in claim 1 or claim 2, in which the non-woven web is thermally-bonded and also comprises a binder resin.

4. The tack pad as claimed in claim 3, in which the binder resin is an ethylene vinylacetate copolymer.

5. A tack pad as claimed in claim 1, impregnated throughout with the tackifier.

6. A tack pad as claimed in claim 1, having an average thickness in the range of 5 mm to 10 mm.

7. A tack pad as claimed in claim 5, further comprising a liner material located on, and releasably-adhering to, one major surface of the pad, the liner material having a low-adhesion coating on the side remote from the pad.

8. A method of making a tack pad comprising the steps of forming a non-woven cross-laid multi-layer web which includes carded thermo-bonding fibers, needle tacking the cross-laid web to provide a web having a thickness of at least about 5 mm, impregnating at least one major surface of the needle tacked web with a heat-reactive acrylic tackifier, and heating to thermally-bond the web and cure the tackifier.

9. A method as claimed in claim 8, in which a binder resin is applied to the web simultaneously with the tackifier and is cured simultaneously with the tackifier.

10. A method as claimed in claim 9, in which the tackifier and the binder resin comprise, respectively, an acrylic pressure sensitive adhesive and an ethylene vinylacetate copolymer and are applied to the web as an aqueous dispersion.

* * * * *

UNITED STATES PATENT AND TRADEMARK OFFICE

CERTIFICATE OF CORRECTION

PATENT NO. : 6,746,974 B1

DATED : June 8, 2004

INVENTOR(S) : Reiterer, Philippe

It is certified that error appears in the above-identified patent and that said Letters Patent is hereby corrected as shown below:

Column 3,
Line 17, below “FIG.1.” insert a new paragraph:
-- Each stage of the process illustrated in Fig. 2 will now be described further. --.

Column 5,
Line 26, after “above” insert -- , --.

Column 10,
Line 10, after “non-woven” insert -- , --.

Signed and Sealed this

Twenty-third Day of May, 2006

JON W. DUDAS

*Director of the United States Patent and Trademark Office*